March 8, 1966  F. A. WEISS  3,239,274
EXTENSIBLE TRAILER FRAME
Filed June 2, 1964  7 Sheets-Sheet 1
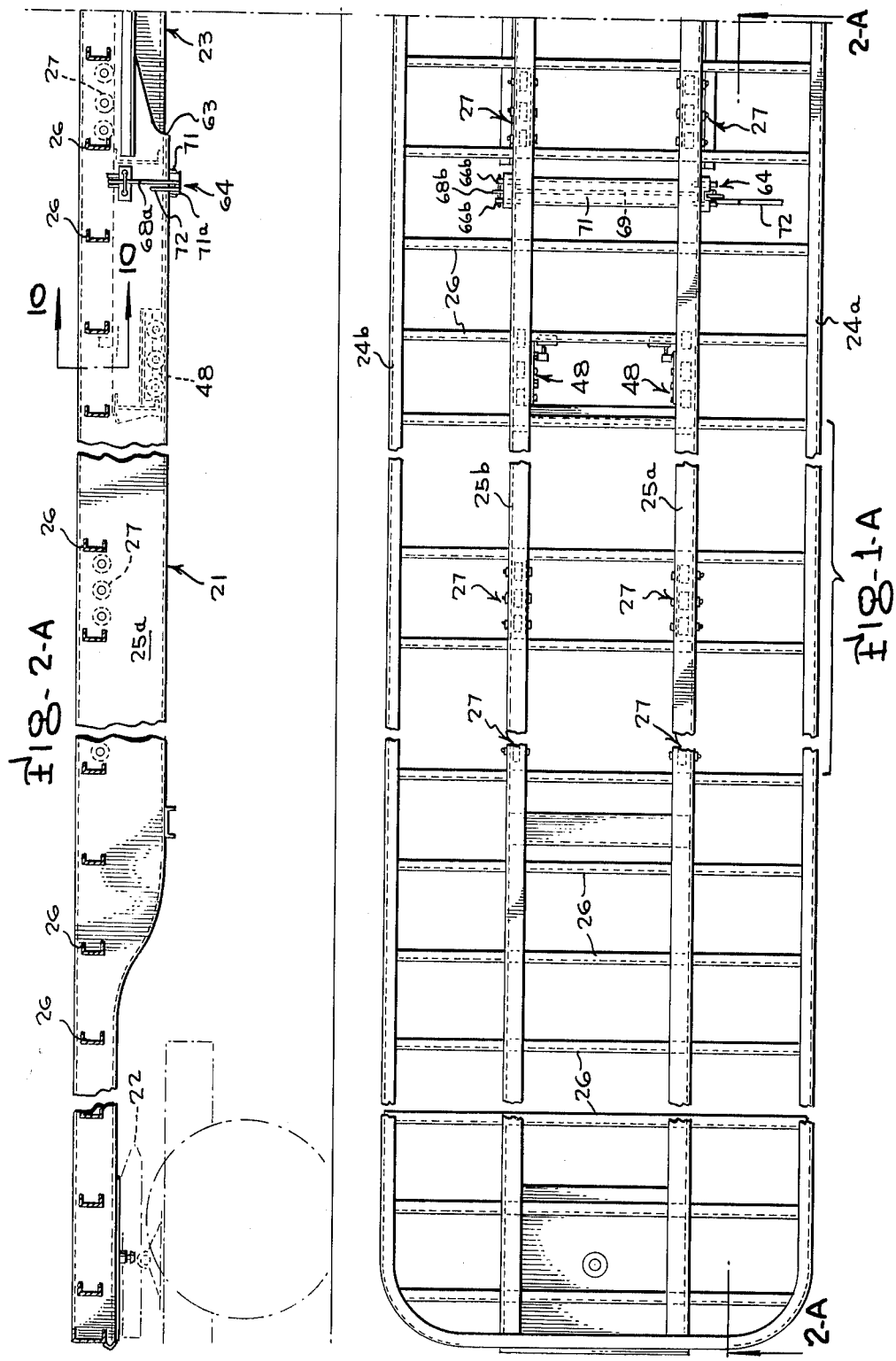

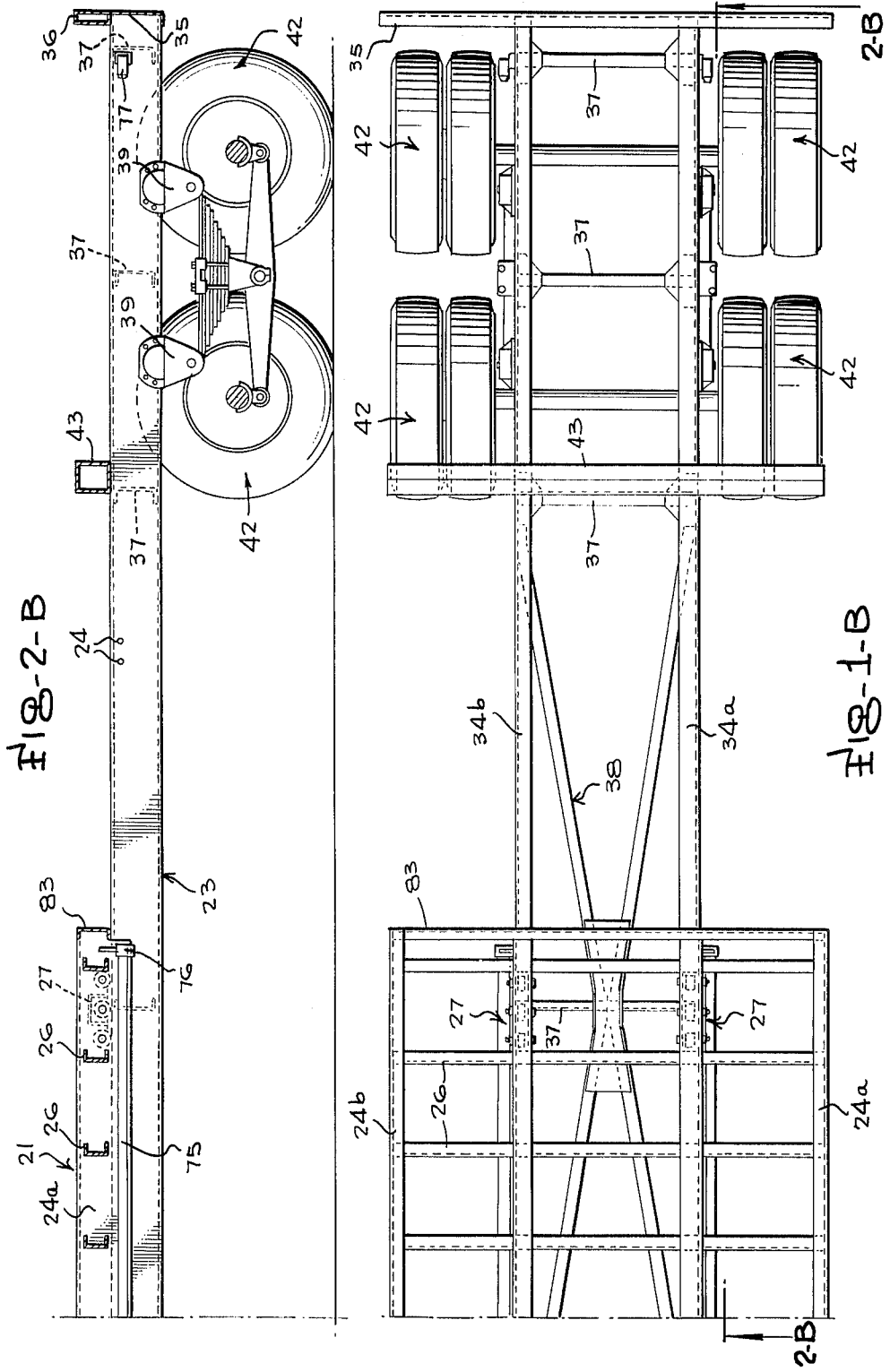

March 8, 1966   F. A. WEISS   3,239,274
EXTENSIBLE TRAILER FRAME
Filed June 2, 1964
7 Sheets-Sheet 3
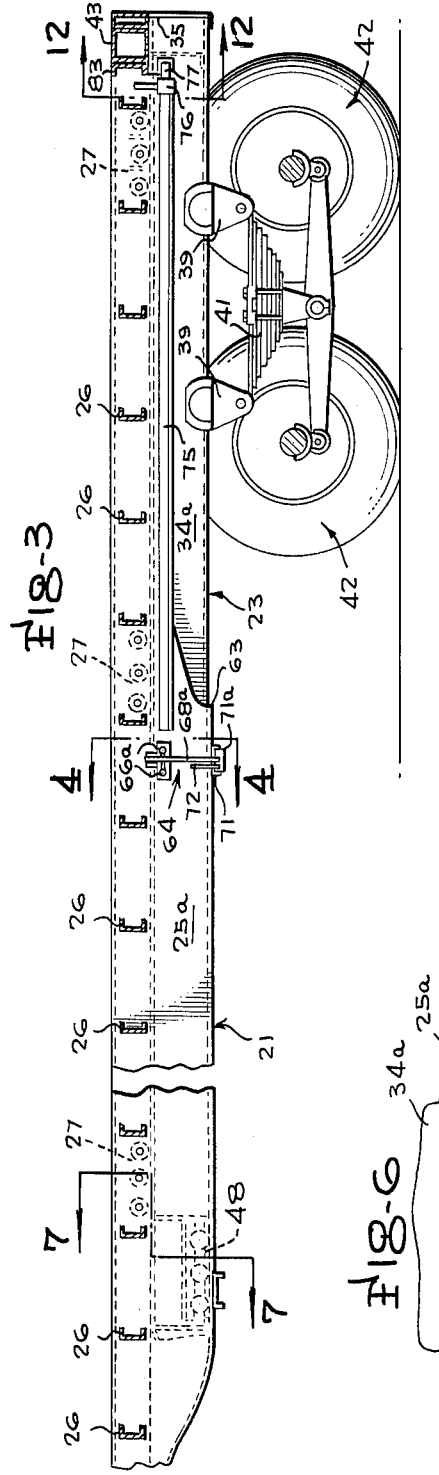
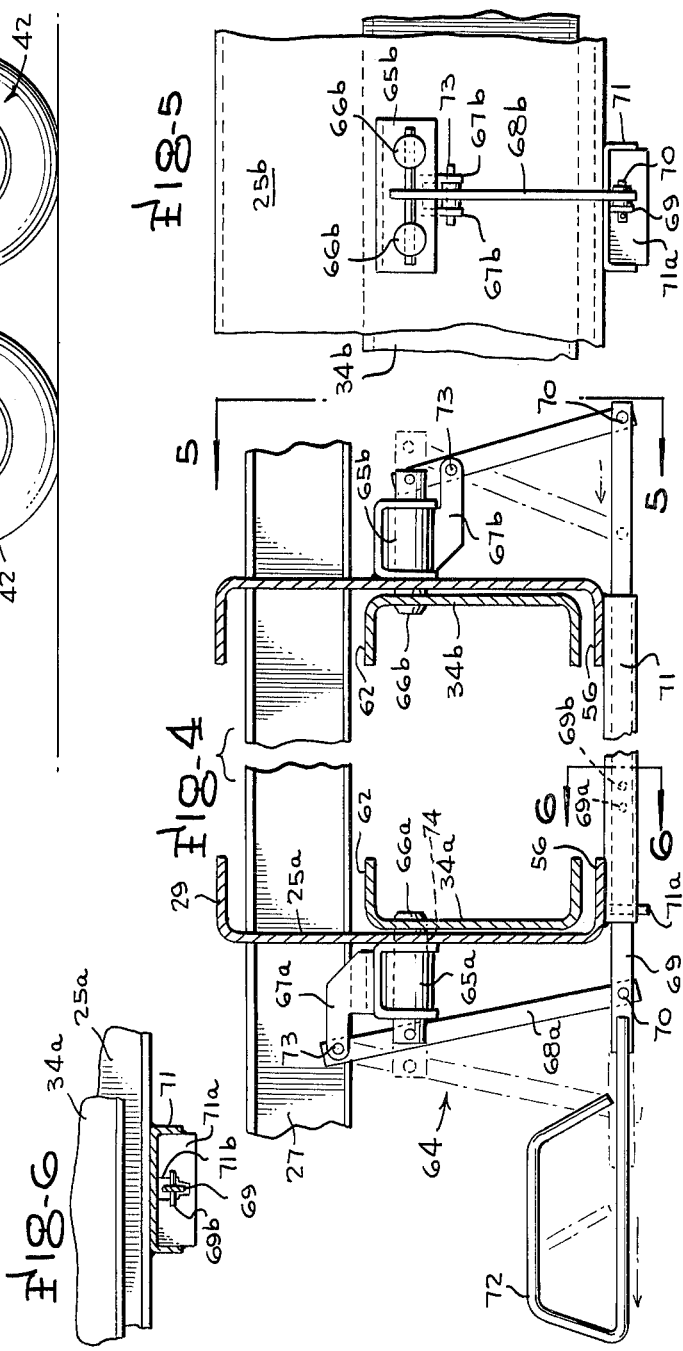
INVENTOR
FREDERICK A. WEISS
BY Mason, Fenwick & Lawrence
ATTORNEYS March 8, 1966 F. A. WEISS 3,239,274
EXTENSIBLE TRAILER FRAME
Filed June 2, 1964 7 Sheets-Sheet 4
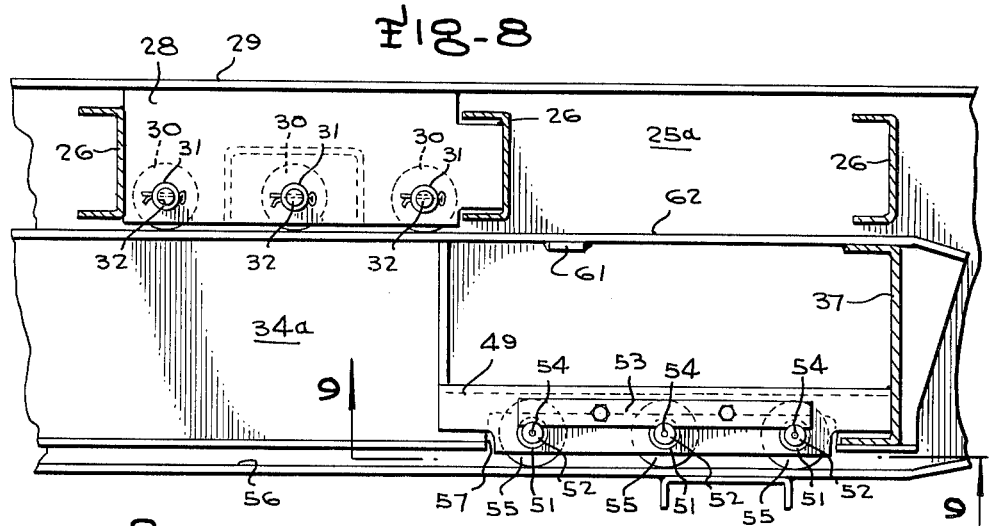
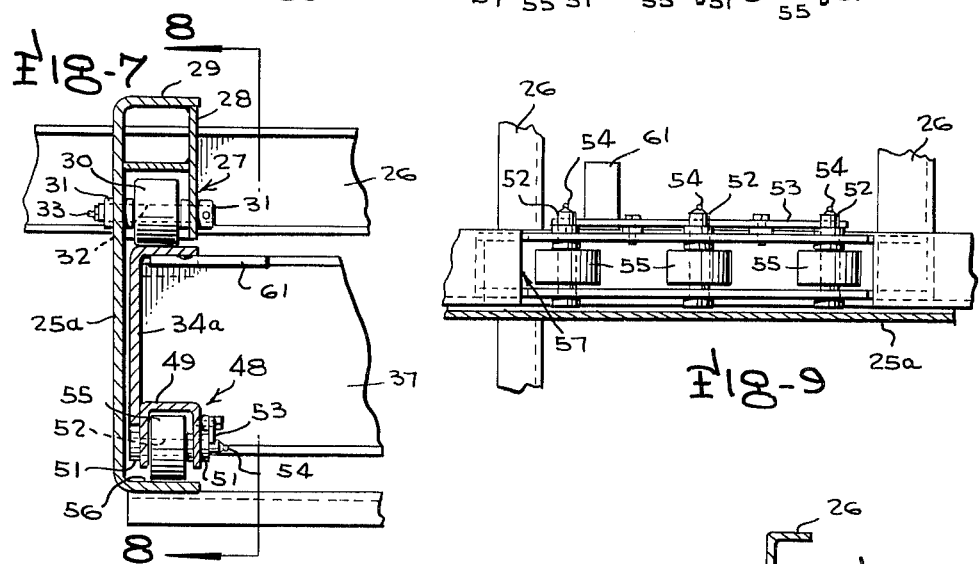
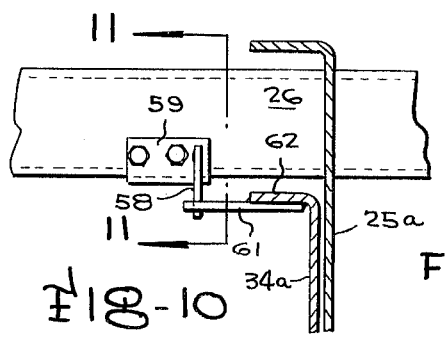
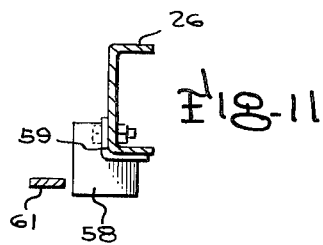
INVENTOR
FREDERICK A. WEISS
BY Mason, Fenwick & Lawrence
ATTORNEYS March 8, 1966  F. A. WEISS  3,239,274
EXTENSIBLE TRAILER FRAME
Filed June 2, 1964  7 Sheets-Sheet 5
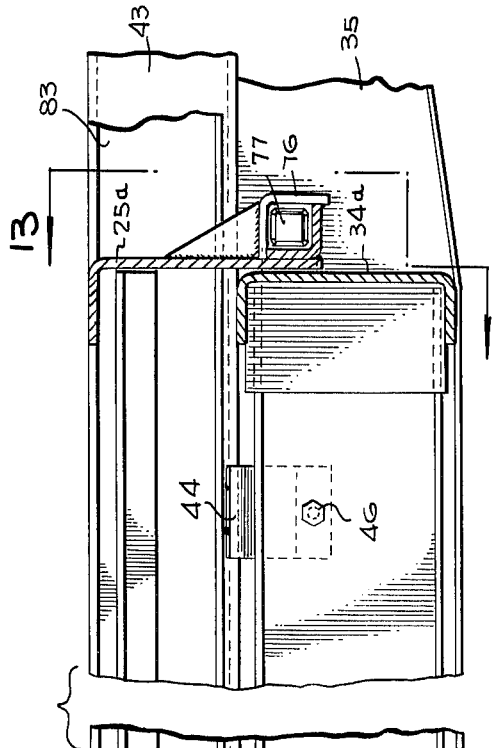
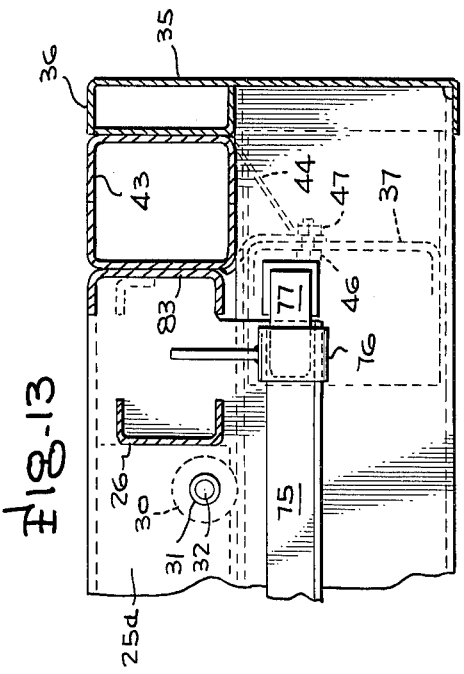
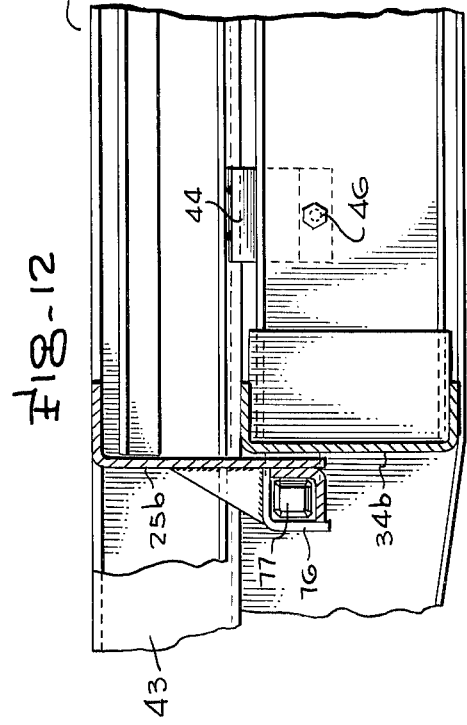
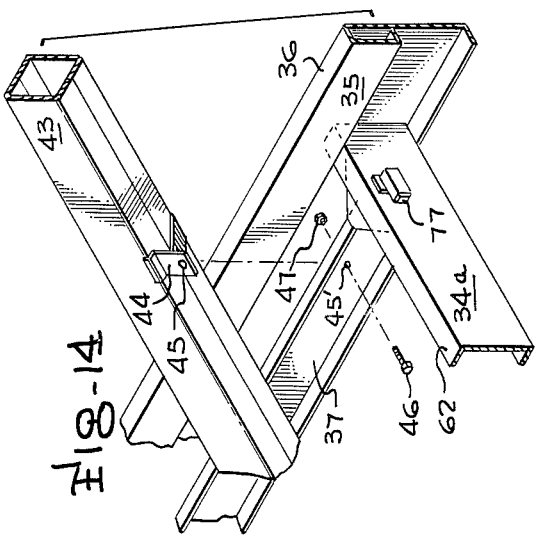
INVENTOR
FREDERICK A. WEISS
BY Mason, Fenwick & Lawrence
ATTORNEYS

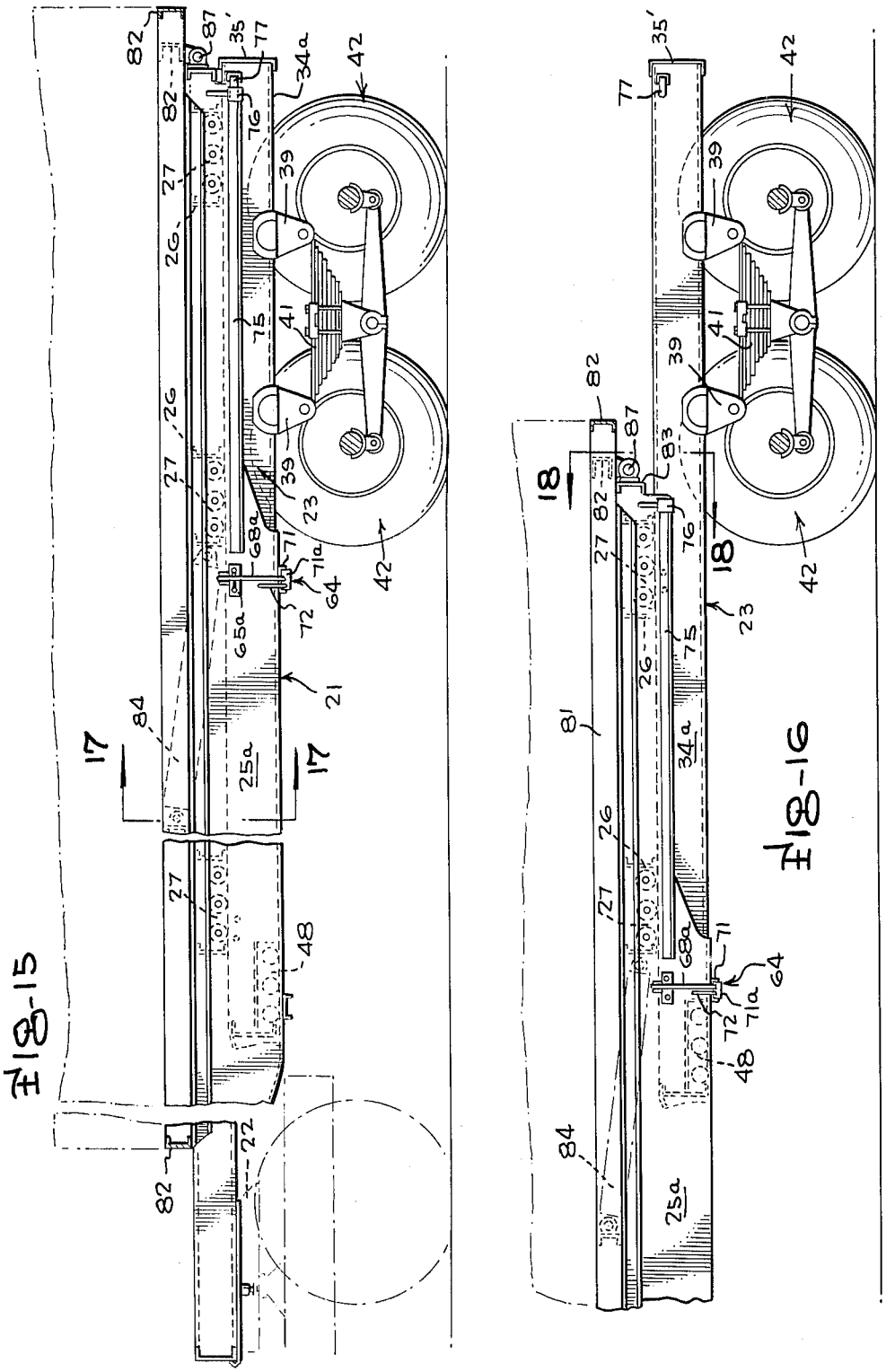

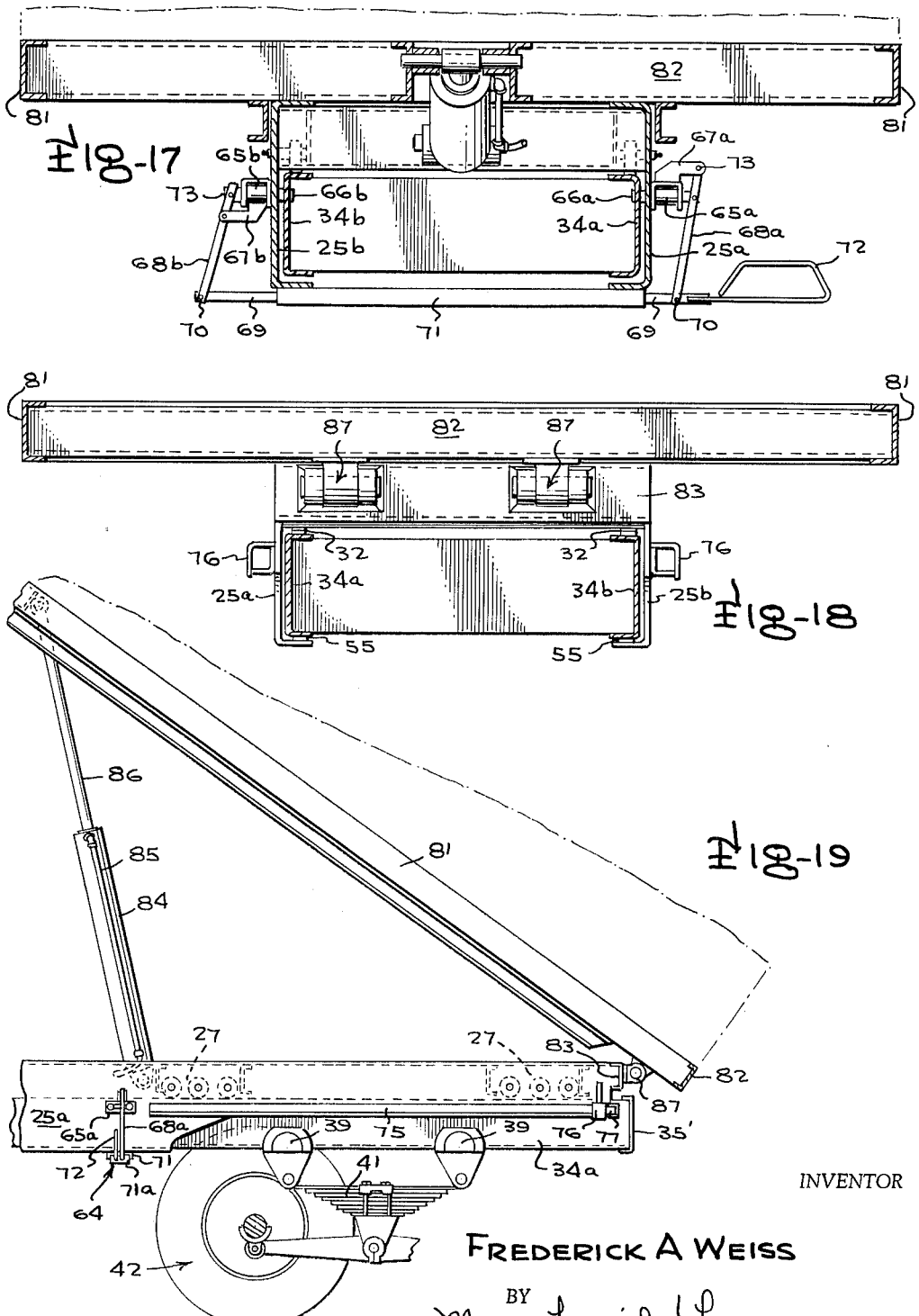

United States Patent Office 3,239,274
Patented Mar. 8, 1966

3,239,274
EXTENSIBLE TRAILER FRAME
Frederick A. Weiss, 1148 Gypsy Lane E., Towson, Md.
Filed June 2, 1964, Ser. No. 371,970
6 Claims. (Cl. 298—17)

This invention relates generally to vehicle trailers and more particularly to trailers having a configuration and construction whereby they may be expanded in length to provide a greater wheel base.

In the past few years economic and technological decisions have dictated that trailers and truck bodies in general become larger in order that these vehicles may be adapted to haul a greater size and tonnage of material. The obvious solution to such a problem is to increase the gross capacity of these vehicles by extending the girth of the carrying portion of the vehicle in order to meet the demands required, however, the States have found that by increasing the gross tonnage of a vehicle on its normal wheel base there is created an extremely destructive effect upon highways which were not built for such a load. It has also been found that by extending the wheel base and by possibly providing additional axles for the truck or trailer, a greater amount of weight could be carried without having a detrimental effect upon the highways. Therefore, it has been the practice of the States to enact legislation which details generally the load a truck may carry in relation to its wheel base and number of axles.

It is, therefore, a primary object of this invention to provide an extensible trailer in which the wheel base may be extended to overcome the problems set forth above.

Another object of this invention is the provision of a trailer having telescoping longitudinally extensible frame members which cooperate with one another to form an extensible trailer.

Another object of this invention is the provision of an extensible trailer whereby the adjustable portions of the trailer are maintained in operable relation by a novel locking means.

A further object of this invention is the provision of an extensible trailer adapted to mount the dump body with the trailer being in the extended position, and then being capable of retracting a portion of the trailer under the dump body when the truck reaches a location in which it is desired to discharge the material in the dump body.

Another object of this invention is the provision of a vehicle trailer which, being of extensible construction, is yet simple and efficient in operation, economical in cost and requires a minimum of maintenance.

Further aims, objects and advantages of this invention will appear from a consideration of the following description and the accompanying drawings showing for purely illustrative purposes embodiments of this invention. It is to be understood, however, that the description is not to be taken in a limiting sense, the scope of the invention being defined in the appended claims.

Referring to the drawings:

FIGURES 1a and 1b together constitute a fragmentary top plan view of one embodiment of the extensible trailer in extended position according to the present invention;

FIGURES 2a and 2b together constitute a longitudinal section view of the trailer taken along lines 2a—2a and 2b—2b of FIGURES 1a and 1b respectively;

FIGURE 3 is a longitudinal section view similar to FIGURES 2a and 2b, however showing the trailer in closed position;

FIGURE 4 is a vertical section view showing the trailer locking mechanism and taken along lines 4—4 of FIGURE 3;

FIGURE 5 is a fragmentary vertical section view showing a portion of the trailer locking mechanism in elevation and taken along lines 5—5 of FIGURE 4;

FIGURE 6 is a vertical section view taken along lines 6—6 of FIGURE 4;

FIGURE 7 is a fragmentary vertical section view taken along lines 7—7 of FIGURE 3;

FIGURE 8 is a vertical section view taken along lines 8—8 of FIGURE 7;

FIGURE 9 is a longitudinal section view taken along lines 9—9 of FIG. 8;

FIGURE 10 is a vertical section view showing the trailer bed stopping mechanism taken along lines 10—10 of FIGURE 2a;

FIGURE 11 is a vertical section view taken along lines 11—11 of FIGURE 10;

FIGURE 12 is a vertical section view taken along lines 12—12 of FIGURE 3;

FIGURE 13 is a vertical section view taken along lines 13—13 of FIGURE 12;

FIGURE 14 is an exploded perspective view of the rearmost portion of the trailer;

FIGURE 15 is a fragmentary side elevation view of a second embodiment of the present invention showing the extensible trailer body adapted to support a dump body;

FIGURE 16 is a side elevation view of trailer and dump body wherein the trailer is extended;

FIGURE 17 is a vertical section view taken along lines 17—17 of FIGURE 15;

FIGURE 18 is a vertical section view taken along lines 18—18 of FIGURE 16; and

FIGURE 19 is a side elevation view of the trailer and dump body showing the dump body in raised position.

Referring to the drawings wherein like reference characters designate corresponding parts throughout the several figures, FIGURES 1, 2 and 3 shows a trailer having a forward section 21 which is adapted to be attached to the tractor by means of the "fifth wheel" 22 shown in phantom in FIGURE 2a. The rearmost section 23 of the trailer is adapted to be telescoped within the forward section 21. Forming the forward section 21 are outer longitudinal beams 24a, 24b which comprise the peripheral extent of the forward section. Located between the outer longitudinal beams and parallel thereto are inner longitudinal support beams 25a, 25b which serve as sliding supports and guide means for the telescoping rearmost section 23. Interconnecting the longitudinal beams and providing sufficient support and bracing therefor are transverse channel bars 26.

To provide rolling support for rearmost section 23 there are located within the confines of inner longitudinal support beams 25a, 25b, roller sets 27 and, as seen from FIGURE 7, the roller sets 27 are supported between vertical support bar 28 depending from the upper channel flange 29 of the inner beams 25a, 25b and the main wall of the inner beams. To effect the support of the individual rollers 30 there is provided a bearing bushing 31 suitably located in both the inner beam and the vertical support bar 28 and fixedly secured thereto preferably by welding or other similar securing means. Extending between the bushings 31 and positioned therein is a roller axle 32 which mounts the roller 30 thereon for rotation. It is anticipated that when the need for lubrication arises such lubrication will be provided to each roller axle 32 through grease fitting 33. As should be noted from the drawings, and especially FIGURES 1, 2 and 3, each of the roller sets 27 are identical.

Comprising the rearmost section 23 are longitudinally slidable channel beams 34a, 34b joined at the rear by a stationary support bed 35 preferably welded to the beams 34a, 34b and further extending above the beams 34a, 34b by an amount to allow its topmost portion 36 to lie in the horizontal plane that passes through the upper channel flange 29 of the inner longitudinal support beams 25a, 25b. To provide additional cross bracing for section 23, rear transverse bars 37 extend between slidable beams 34a, 34b and an "X" frame 38 is located centrally of section 23. Fixedly mounted to beams 34a, 34b are spring shackles 39 between which extend the leaf springs 41. The wheel sets 42, of conventional design, are securely mounted to the springs 41 in a suitable manner, which manner does not form a part of this invention. Adapted to be positioned upon beams 34a, 34b is movable support bed 43 of elongated rectangular configuration such that it extends upwardly from beams 34a, 34b the same height as stationary bed 35. Because of the movable nature of bed 43 there is provided a plurality of depending brackets 44 each having an aperture 45 adapted to register with a similar aperture 45' in the rear transverse bars 37 whereby a fastener bolt 46 would then be inserted through the aligned and register apertures 45, 45' and secured by nut 47. Such a procedure allows bed 43 to be positioned in good supporting relation to the load that is to be carried by the trailer and then be firmly secured to a suitable transverse bar 37 to prevent any movement of the movable bed once it is in a desired position.

Affixed to the forward end of section 23 to provide rolling support therefor is a pair of forward roller members 48, details of which are shown in FIGURES 7–9, each comprising a channel support bracket 49 welded to the interior of channel beams 34a, 34b. The channel support bracket 49 is suitably apertured to receive bushings 51 that are adapted to support axles 52. The axles are secured in place by keeper bar 53 which engage the axles 52 by a notch cut therein (not shown). To provide proper lubrication to the bushings 51 and axles 52, grease fittings 54 are mounted in conjunction therewith. Rotatably supported upon the axles 52 are rollers 55 which assume the function of supporting the forward end of section 23 in rolling engagement with lower channel flange 56 of support beams 25a, 25b. It should be noted that, to provide access of the rollers 55 to flange 56, a portion of beam 34a, 34b is cut out, indicated by numeral 57 in FIGURES 8 and 9, and that the rollers project therethrough to engage flange 56. The rearmost section 23 of the trailer is therefore supported by the wheels and by forward section 21 through the rollers 55 upon flange 56 in vertical alignment with beams 25a, 25b and by rollers 30 rolling along the top of beams 34a, 34b to keep substantial downward pressure upon the beams and maintain the trailer section 23 in telescoping alignment with forward section 21.

To prevent the rearmost trailer section 23 from being withdrawn from telescoping relation with the trailer forward section 21 there is provided a stop means which comprises a vertically aligned stationary stop member 58 welded to a plate 59 which is in turn preferably fastened to one of the transverse channel bars 26, as is indicated in FIGURE 10. Adapted to co-act with stationary stop member 58 is a movable stop member 61 that is welded to the upper horizontal flange 62 of both of the slidable beams 34a, 34b at a position very near to the far most end of the beams. The longitudinal extent of the stationary stop member 58 and movable stop member 61 is such that when the rearmost section 23 of the trailer is moved rearwardly the stop members are moved into an abutting relation whereby a continued rearward movement of section 23 is prevented. It is anticipated that the stop members may be located at any desired point on the forward section 21 and rear section 23, however, in order to have maximum extension of the trailer the moving stop member 61 should be located at the forward end of the section 23 whereas the stationary stop member 58 should be located upon a tranverse channel bar 26 which is spaced rearwardly of section 21 to such a degree that the extent of the trailer is stopped before the forward roller member 48 disengages from lower channel flange 56 at its end point indicated by numeral 63 in FIGURE 2a.

To maintain the trailer in either a closed position or an extended position there is provided a novel catch and lock means generally indicated by numeral 64 which is mounted upon inner longitudinal support beams 25a, 25b. Comprising catch and lock means 64 are latch pin guides 65a, 65b welded to the vertical mid point of support beams 25a, 25b and projecting perpendicularly exterior thereof. Adapted to be mounted within the latch pin guides are pairs of latch pins 66a, 66b which project through suitable apertures in the latch pin guides and through suitable aligned and registered apertures 74 within the support beams. Attached to each of the latch pin guides is a pivot arm indicated by numeral 67a upon latch pin guides 65a and 67d upon latch pin 65b. As can be seen from FIGURE 4 the pivot arms are so oppositely attached to the guides so that pivot arm 67a is above guide 65a and pivot arm 67b is below guide 64b. Pivoted to the pivot arms by pivot pins 73 and interlinked with the latch pins are linkage arms 68a, 68b. The linkage arms are interlinked at the end most remote from pivot point pins 73 with connecting arm 69 and secured thereto by connecting arm pivot pins 70. The arm 69 is adapted to be reciprocated within the guide channel 71 A handle 72 is fitted to connecting arm 69 in order that the one operating the catch and lock means 64 may easily grasp the handle when standing outside the peripheral extent of the trailer. To assist in locking the connecting arm 69 in an open position the arm has positioned therein transverse to its longitudinal length a pair of projecting pins 69a, 69b of which pin 69a is the shorter of the two. Located transverse to the guide channel 71 and at one end thereof is a slotted plate member 71a in which the slot 71b has an upper portion that is wide enough to allow pin 69a to pass therethrough but not pin 69b, and the lower portion of the slot 71b is not wide enough to permit passage of either projecting pin. To lock the arm 69, the first pin 69a is moved through the upper portion of the slot 71b and then the handle 72 is pushed downwardly to move arm 69 downwardly in order to position pin 69a about one side of the lower portion of the slot 71b and the pin 69b about the other side of the slot. Since there is a sufficient looseness in the lock means 64 the arm 69 remains in this locked position until removed. In FIGURE 4 the catch and lock means 64 is shown to be in a locked position whereby holding the trailer against telescoping movement, however, if it is desired to extend or to close the trailer the operator would grasp the handle 72 and move it laterally in the direction to the outside of the trailer whereby the linkage arms 68a, 68b would be moved with the connecting arm 69 in the same direction as the handle 72 is moved. Such a movement would cause linkage arms to pivot about pivot pins 73 and retract the latch pins 66a, 66b from the pairs of apertures 74 which are located within sliding beams 34a, 34b. It should be noted that the sliding beams may have any reasonable number of pairs of apertures 74 in order that a relatively large number of trailer extension positions may be obtained.

Lying horizontally alongside and welded to the outside portion of support beams 25a, 25b is a box-like bracing member 75. The bracing member 75 at its rearmost end has an enlarged area 76 which is adapted to receive the projecting stud 77 therein whenever the trailer sections are in a closed position.

In the embodiment of the present invention shown in FIGURES 15 to 19 the present trailer is adapted to receive upon the forward section 21 a dump body which is shown in the phantom lines of the figures. The dump body comprises a floor 81 having transverse channel members 82 to provide both bracing and support for the body. The body floor 81 is hingedly attached to the rearmost end channel member 83 of the forward section 21 by the means of a pair of suitable hinges 87, one-half of each being welded to the end channel member 83 and the other half being welded to a body transverse channel member 82. To provide lift for the dump body a hydraulic cylinder 84 is operatively connected between a suitable transverse channel member 26 of forward section 21 and the channel member 82 of the body floor. Upon pressurized fluid being transmitted through hydraulic line 85 to the cylinder 84 the cylinder arm 86 will operate against the dump body and raise the front of the dump body to an elevated position such as is shown in FIGURE 19. As seen in FIGURE 19 it is imperative that the rearmost section 23 be telescoped into forward section 21 upon the dump body being operatively raised to permit the discharge of any material contained therein. In all other respects the embodiment described herein is essentially the same as the preferred embodiment described herein above with the exceptions being that the dump body is placed upon the forward section 21 and the stationary support bed 35' is shortened in height to permit the complete closure of sections 21 and 23 and to permit the dump body to clear the rear end of the trailer when the body is being raised to a dumping position.

In operation of the preferred embodiment the normal procedure to extend the trailer when the sections are in closed position would be to set the brakes and wheel sets 42, disengage the latch pins 66a, 66b from sliding beams 34a, 34b by laterally moving handle 72 outwardly allowing connecting arm 69 to pivot linkage arms 68a, 68b about pivot pins 73. At this time the sections 21 and 23 are unlocked from one another and then it is a simple matter for the truck operator to move the truck and pull the forward section 21 of the trailer away from the rearmost section 23 until the stationary stop member 58 and moving stop member 61 come into contact. At this point the trailer is fully open and a pair of apertures 74 are in alignment with latch pins 66a, 66b and the operator merely has to laterally move handle 72 inwardly to a closed position thereby engaging the latch pins when the apertures 74 are in registry to securely lock sections 21 and 23 together in open relation.

To operate the second embodiment the same general procedure as described above is followed in order that an increased wheel base may be had to permit the carrying of heavier loads within the dump body. However, once the truck and trailer are at the site where the material in the dump body is to be discharged it is necessary to close the trailer by setting the brakes and wheel sets 42, unlatching the lock means 64 in the manner above described, and then backing the truck and the forward section 21 rearwardly, thereby telescoping section 23 within the forward section. By the rearward motion of forward section 21 the dump body is carried rearwardly with it until a fully closed position is reached at which time the lock means 64 is then re-engaged to lock the sections together. It is then possible to operate the dump body and discharge the material therein.

It has been shown in the above description where a new and novel extensible trailer has been perfected to overcome the burdens placed upon the trucking industry by the various states in their pursuit to protect the highways. Further, a trailer has been shown whereby it is easily adjustable, safely locked by a novel locking means and adapted to mount a dump body with the trailer being extensible for traveling purposes and then retractable when it is desired to discharge the material in the dump body.

While I have particularly shown and described one particular embodiment of the invention, it is distinctly understood that the invention is not limited thereto but that modifications may be made within the scope of the invention and such variations as are covered by the scope of the appended claims.

What is claimed is:

1. An adjustable truck trailer comprising a forward section and a rearmost section, the forward section adapted to have its front end supported by a truck, the rearmost section being partially supported by a wheel assembly, the forward section comprising a generally longitudinal framework having outer longitudinal beams and inner longitudinal support beams and having transversely extending channel bars secured to the outer longitudinal beams and the inner longitudinal support beams, the inner longitudinal support beams being channel shaped and having upper and lower flanges, the rearmost section comprising longitudinally movable beams operatively connected with the forward section in telescopically slidable relation so that the trailer can be foreshortened or lengthened at will whereby the wheel base between rear wheel assembly and the truck may be set at a predetermined distance, the rearmost longitudinally movable beams being channel shaped and having upper and lower flanges, antifriction roller means effective between the forward section and the rearmost section to allow free relative movement therebetween to permit lengthening and shortening of the wheel base, the roller means comprising forward section roller sets secured to the inner support beams including a plurality of roller wheels adapted to move upon the upper flange of each rearmost movable beam, and rearmost section roller sets secured to the movable beams adapted to move upon the lower flange of each support beam, locking means adapted to secure the forward section to the rearmost section at a plurality of predetermined positions, and stop means associated with the forward section and the rearmost section to prevent the disengagement of the sections, a longitudinally movable support bed carried upon the upper flange of the movable beams, means associated with the support bed for positioning the support bed in a plurality of predetermined positions.

2. An adjustable truck trailer comprising a forward section and a rearmost section, the forward section adapted to have its front end supported by a truck, the rearmost section being partially supported by a wheel assembly, the forward section comprising a generally longitudinal framework having outer longitudinal beams and inner longitudinal support beams and having transversely extending channel bars secured to the outer longitudinal beams and the inner longitudinal support beams, the rearmost section comprising longitudinally movable beams operatively connected with the forward section in telescopically slidable relation so that the trailer can be foreshortened or lengthened at will whereby the wheel base between rear wheel assembly and the truck may be set at a predetermined distance, antifriction roller means effective between the forward section and the rearmost section to allow free relative movement therebetween to permit lengthening and shortening of the wheel base, locking means adapted to secure the forward section to the rearmost section at a plurality of predetermined positions comprising laterally extending apertured latch pin guides mounted upon the support beams having latch pins slidably supported in the guides, a plurality of sets of longitudinally spaced apertures in both the support beams and movable beams capable of registry to receive the pins in extended locking positions, a pivot arm secured to each of the guides, a connecting arm extending laterally transverse to the trailer, linkage arms interconnecting the connecting arm, pivot arms and latch pins whereby upon lateral movement of the connecting arm the latch pins are capable of locking and unlocking the trailer sections, and stop means associated with the forward section and the rearmost section comprising a vertically mounted stationary stop member secured to a suitable transversely extending channel bar and a horizontally mounted stop member secured to one end of the rearmost section movable beams whereby upon the trailer being lengthened to the maximum extent the vertically mounted stop member extends perpendicularly across the intended path of the horizontal stop member to interact with the horizontal stop member and prevent the trailer sections from being extended past a predetermined point.

3. An adjustable truck trailer comprising a forward section and a rearmost section, the forward section adapted to have its front end supported by a truck, the rearmost section being partially supported by a wheel assembly, the forward section comprising a generally longitudinal framework having outer longitudinal beams and inner longitudinal support beams and having transversely extending channel bars secured to the outer longitudinal beams and the inner longitudinal support beams, the inner longitudinal support beams being channel shaped and having upper and lower flanges, the rearmost section comprising longitudinally movable beams operatively connected with the forward section in telescopically slidable relation so that the trailer can be foreshortened or lengthened at will whereby the wheel base between rear wheel assembly and the truck may be set at a predetermined distance, the rearmost longitudinally movable beams being channel shaped and having upper and lower flanges, anti-friction roller means effective between the forward section and the rearmost section to allow free relative movement therebetween to permit lengthening and shortening of the wheel base, the roller means comprising forward section roller sets secured to the inner support beams including a plurality of roller wheels adapted to move upon the upper flange of each rearmost movable beam, and rearmost section roller sets secured to the movable beams adapted to move upon the lower flange of each support beam, locking means adapted to secure the forward section to the rearmost section at a plurality of predetermined positions, a longitudinally movable support bed carried upon the upper flange of the movable beams, means associated with the support bed for positioning the support bed in a plurality of predetermined positions, and stop means associated with the forward section and the rearmost section comprising a vertically mounted stationary stop member secured to a suitable transversely extending channel bar and a horizontally mounted stop member secured to one of the rearmost section movable beams whereby upon the trailer being lengthened to the maximum extent the vertically mounted stop member extends perpendicularly across the intended path of the horizontal stop member to interact with the horizontal stop member and prevent the trailer sections from being extended past a predetermined point.

4. An adjustable truck trailer comprising a forward section and a rearmost section, the forward section adapted to have its front end supported by a truck, the rearmost section being partially supported by a wheel assembly, the forward section comprising a generally longitudinal framework having outer longitudinal beams and inner longitudinal support beams and having transversely extending channel bars secured to the outer longitudinal beams and the inner longitudinal support beams, the inner longitudinal support beams being channel shaped and having upper and lower flanges, the rearmost section comprising longitudinally movable beams operatively connected with the forward section in telescopically slidable relation so that the trailer can be foreshortened or lengthened at will whereby the wheel base between rear wheel assembly and the truck may be set at a predetermined distance, the rearmost longitudinally movable beams being channel shaped and having upper and lower flanges, anti-friction roller means effective between the forward section and the rearmost section to allow free relative movement therebetween to permit lengthening and shortening of the wheel base, the roller means comprising forward section roller sets secured to the inner support beams including a plurality of roller wheels adapted to move upon the upper flange of each rearmost movable beam, and rearmost section roller sets secured to the movable beams adapted to move upon the lower flange of each support beam, locking means adapted to secure the forward section to the rearmost section at a plurality of predetermined positions comprising laterally extending apertured latch pin guides mounted upon the support beams having latch pins slidably supported in the guides, a plurality of sets of longitudinally spaced apertures in both the support beams and movable beams capable of registry to receive the pins in extended locking positions, a pivot arm secured to each of the guides, a connecting arm extending laterally transverse to the trailer, linkage arms interconnecting the connecting arms, pivot arm and latch pins whereby upon lateral movement of the connecting arm the latch pins are capable of locking and unlocking the trailer sections, a longitudinally movable support bed carried upon the upper flange of the movable beams, means associated with the support bed for positioning the support bed in a plurality of predetermined positions, and stop means associated with the forward section and the rearmost section comprising a vertically mounted stationary stop member secured to a suitable transversely extending channel bar and a horizontally mounted stop member secured to one of the rearmost section movable beams whereby upon the trailer being lengthened to the maximum extent the vertically mounted stop member extends perpendicularly across the intended path of the horizontal stop member to interact with the horizontal stop member and prevent the trailer sections from being extended past a predetermined point.

5. An adjustable truck trailer comprising a forward section and a reamost section, the forward section adapted to have its front end supported by a truck, the rearmost section being partially supported by a wheel assembly, the forward section comprising a generally longitudinal framework having outer longitudinal beams and inner longitudinal support beams and having transversely extending channel bars secured to the outer longitudinal beams and the inner longitudinal support beams, the inner longitudinal support beams being channel shaped and having upper and lower flanges, the rearmost section comprising longitudinally movable beams operatively connected with the forward section in telescopically slidable relation so that the trailer can be foreshortened or lengthened at will whereby the wheel base between rear wheel assembly and the truck may be set at a predetermined distance, the rearmost longitudinally movable beams being channel shaped and having upper and lower flanges, anti-friction roller means effective between the forward section and the rearmost section to allow free relative movement therebetween to permit lengthening and shortening of the wheel base, the roller means comprising forward section roller sets secured to the inner support beams including a plurality of roller wheels adapted to move upon the upper flange of each rearmost movable beam, and rearmost section roller sets secured to the movable beams adapted to move upon the lower flange of each support beam, locking means adapted to secure the forward section to the rearmost section at a plurality of predetermined positions, and stop means associated with the forward section and the rearmost section to prevent the disengagement of the sections, a dump body mounted upon the forward section with freedom for pivotal motion in the vertical plane, the dump body being pivoted about the posterior portion of the forward section and adapted to be operated at such time as the trailer sections are in fully telescoped relation.

6. An adjustable truck trailer comprising a forward section and a rearmost section, the forward section adapted to have its front end supported by a truck, the rearmost section being partially supported by a wheel assembly, the forward section comprising a generally longitudinal framework having outer longitudinal beams and inner longitudinal support beams and having transversely extending channel bars secured to the outer longitudinal beams and the inner longitudinal support beams, the inner longitudinal support beams being channel shaped and having upper and lower flanges, the rearmost section comprising longitudinally movable beams operatively connected with the forward section in telescopically slidable relation so that the trailer can be foreshortened or lengthened at will whereby the wheel base between rear wheel assembly and the truck may be set at a predetermined distance, the rearmost longitudinally movable beams being channel shaped and having upper and lower flanges, antifriction roller means effective between the forward section and the rearmost section to allow free relative movement therebetween to permit lengthening and shortening of the wheel base, the roller means comprising forward section roller sets secured to the inner support beams including a plurality of roller wheels adapted to move upon the upper flange of each rearmost movable beam, and rearmost section roller sets secured to the movable beams adapted to move upon the lower flange of each support beam, locking means adapted to secure the forward section to the rearmost section at a plurality of predetermined positions comprising laterally extending apertured latch pin guides mounted upon the support beams having latch pins slidably supported in the guides, a plurality of sets of longitudinally spaced apertures in both the support beams and movable beams capable of registry to receive the pins in extended locking positions, a pivot arm secured to each of the guides, a connecting arm extending laterally transverse to the trailer, linkage arms interconnecting the connecting arms, pivot arm and latch pins whereby upon lateral movement of the connecting arm the latch pins are capable of locking and unlocking the trailer sections, a longitudinally movable support bed carried upon the the upper flange of the movable beams, means associated with the support bed for positioning the support bed in a plurality of predetermined positions, stop means associated with the forward section and the rearmost section comprising a vertically mounted stationary stop member secured to a suitable transversely extending channel bar and a horizontally mounted stop member secured to one of the rearmost section movable beams whereby upon the trailer being lengthened to the maximum extent the vertically mounted stop member extends perpendicularly across the intended path of the horizontal stop member to interact with the horizontal stop member and prevent the trailer sections from being extended past a predetermined point, a dump body mounted upon the forward section with freedom for pivotal motion in the vertical plane, the dump body being pivoted about the posterior portion of the forward section and adapted to be operated at such time as the trailer sections are in fully telescoped relation.

References Cited by the Examiner

UNITED STATES PATENTS

| | | | |
|---|---|---|---|
| 1,887,118 | 11/1932 | Collinge | 280—423 |
| 2,676,815 | 4/1954 | Bennett | 280—81 |
| 2,812,088 | 11/1957 | Cadillac et al. | |
| 2,900,194 | 8/1959 | De Lay | 280—34 |
| 2,962,295 | 11/1960 | Tennenbaum | 280—81 |
| 3,087,741 | 4/1963 | De Lay | 280—81 |
| 3,181,914 | 5/1965 | Humes | 280—80 X |

FOREIGN PATENTS 600,640  12/1959  Italy.

KENNETH H. BETTS, *Primary Examiner.*